United States Patent [19]  [11] Patent Number: 5,019,540
Kuramoto et al.  [45] Date of Patent: May 28, 1991

[54] METAL DIBORIDE BASE SINTERED CERAMIC AND METHOD OF PRODUCING SAME

[75] Inventors: Toru Kuramoto, Ube; Hitoshi Tukuda, Ichikawa; Hiroshi Ono, Ube, all of Japan

[73] Assignee: Central Glass Company, Limited, Ube, Japan

[21] Appl. No.: 491,063

[22] Filed: Mar. 9, 1990

[30] Foreign Application Priority Data

Mar. 13, 1989 [JP] Japan .................. 1-60539

[51] Int. Cl.$^5$ ............................. C04B 35/58
[52] U.S. Cl. ........................ 501/96; 501/98
[58] Field of Search .............. 501/96, 98; 423/409, 423/411, 412, 290, 297

[56] References Cited

U.S. PATENT DOCUMENTS

| 2,872,327 | 2/1959 | Taylor | 501/96 |
| 3,649,314 | 3/1972 | James | 501/96 |
| 4,379,852 | 4/1983 | Watanabe et al. | 501/98 |
| 4,889,836 | 12/1989 | Buljan et al. | 501/96 |

FOREIGN PATENT DOCUMENTS

| 57-42578 | 3/1982 | Japan . |
| 58-55378 | 4/1983 | Japan . |
| 60-103080 | 6/1985 | Japan . |
| 60-195061 | 10/1985 | Japan . |
| 61-97169 | 5/1986 | Japan . |
| 894104 | 4/1962 | United Kingdom . |
| 1558068 | 12/1979 | United Kingdom . |

Primary Examiner—William R. Dixon, Jr.
Assistant Examiner—Anthony J. Green
Attorney, Agent, or Firm—Fleit, Jacobson, Cohn, Price, Holman & Stern

[57] ABSTRACT

The invention provides a sintered ceramic of which the principal component is $TiB_2$ and/or $ZrB_2$. The sintered ceramic contains a vanadium compound such as VC, VB or VN and/or a molybdenum compound such as MoC, $MoSi_2$ or MoB such that the content of V and/or Mo is 0.5–99.5 wt % of the principal component. Furthermore, the sintered ceramic contains at least one nitride such as TiN, ZrN, TaN or CrN amounting to 1–50 wt % of the principal component and carbon amounting to 0.5–10 wt % of the principal component. The sintered ceramic is high in hardness and mechanical strength and, by virtue of including a nitride in the additives, is particularly enhanced in fracture toughness. The sintered ceramic is produced by mixing a principal material, $TiB_2$ and/or $ZrB_2$, with at least one vanadium or molybdenum compound, or elementary V and/or Mo, at least one nitride and carbon or a carbonizable material, compacting the resulting mixture into a shaped body and sintering the shaped body in vacuum or a nonoxidizing gas atmosphere at 1600°–2200° C.

6 Claims, No Drawings

METAL DIBORIDE BASE SINTERED CERAMIC AND METHOD OF PRODUCING SAME

BACKGROUND OF THE INVENTION

This invention relates to a titanium diboride and/or zirconium diboride base sintered ceramic and a method of producing same.

Sintered ceramics using either $TiB_2$ or $ZrB_2$ as the principal component are very high in heat resistance, corrosion resistance, hardness and wear resistance. Accordingly $TiB_2$ and/or $ZrB_2$ base sintered ceramics will be very useful, for example, as heat insulating materials and mechanical materials for cutting tools, machine parts, heat engine parts, rocket components, etc. Also it is conceivable to utilize good electrical conductivities of these ceramics.

However, both $TiB_2$ and $ZrB_2$ are poor in sintering activity. If $TiB_2$ or $ZrB_2$ alone is sintered the sintered body is very brittle and low in deflective strength. Therefore, various additives have been tried for improving the mechanical properties of $TiB_2$ or $ZrB_2$ base sintered ceramics and also other metal diboride base sintered ceramics. For example, there are the following proposals.

JP-A No. 57-42578 shows the addition of a metal monoboride and at least one metal carbide, silicide, nitride or oxide. JP-A No. 58-55378 shows the addition of zirconium oxide. JP-A No. 60-103080 shows the addition of a compound boride of W and Fe, Co or Ni. JP-A No. 60-195061 shows the addition of molybdenum silicide. JP-A No. 61-97169 shows the addition of a metal monoboride and titanium carbonitride.

However, most of the above proposals require hot-press sintering to obtain sintered ceramics of good mechanical properties since the products of sintering under normal pressure are insufficient in deflective strength. Furthermore, $TiB_2$ and/or $ZrB_2$ base sintered ceramics proposed until now are generally insufficient in fracture toughness.

SUMMARY OF THE INVENTION

It is an object of the present invention to provide a titanium diboride and/or zirconium diboride base sintered ceramic which is enhanced in fracture toughness without sacrificing other properties and has sufficiently high deflective strength even when the sintering is performed under normal pressure.

It is another object of the invention to provide a method of producing a sintered ceramic body according to the invention.

The present invention provides a metal diboride base sintered ceramic, comprising a base component which is at least one metal diboride selected from $TiB_2$ and $ZrB_2$, an auxiliary component which is at least one compound of a metal selected from vanadium and molybdenum, the amount of the auxiliary component being such that the content of V and/or Mo in the sintered ceramic is 0.5–99.5 wt % of the base component, at least one metal nitride amounting, in total, to 1–50 wt % of the base component and carbon amounting to 0.5–10 wt % of the base component.

Further, the invention provides a method of producing a $TiB_2$ and/or $ZrB_2$ base sintered ceramic body, comprising the steps of (a) mixing 100 parts by weight of a powdery principal material, which is $TiB_2$ and/or $ZrB_2$, with a powdery first additive which is at least one source of a metal selected from V and Mo and contains 0.5 to 99.5 parts by weight of V and/or Mo, 1 to 50 parts by weight of a powdery second additive which is at least one nitride and a third additive which is a carbon source and contains 0.5 to 10 parts by weight of carbon, (b) compacting the mixture obtained at step (a) into a desirably shaped body, and (c) sintering the shaped body in vacuum or a nonoxidizing gas atmosphere at a temperature in the range from 1600° to 2200° C.

As stated above, in the present invention either of $TiB_2$ and $ZrB_2$ can be employed as the principal material, and it is also possible to use a mixture of $TiB_2$ and $ZrB_2$ at an arbitrary ratio.

The primary feature of the invention is introducing a nitride such as, for example, TiN or TaN into the sintered ceramic in combination with carbon and at least one compound of vanadium or molybdenum. The addition of a titanium compound brings about remarkable enhancement of the fracture toughness of the sintered ceramic. To gain this effect it is not necessary to perform the sintereing under high pressure. The reason for this effect has not yet been fully elucidated. Considering an exemplary case of adding VC, TiN and C to $TiB_2$, the sintered ceramic will have a very intricate structure constituted of various compounds such as $TiB_2$, TiN, TiC, VC, BN, etc. and their solid solutions, and it is presumable that such intricateness of the structure makes an important contribution to enhancement of fracture toughness.

The addition of carbon is also important. At the stage of sintering, carbon acts as a sintering promotor and, besides, serves the function of removing oxygen from the environmental gas atmosphere and also from some oxides (e.g., of Fe, Ca, Mg, Zr and/or Nb) possibly contained in the principal material, $TiB_2$ and/or $ZrB_2$. In the sintered ceramic carbon exists as carbides.

The sintered ceramic according to the invention is very high in relative density and has a very fine and tight crystal structure even when the sintering is performed under normal pressure or reduced pressure. Usually most of the craystal grains in the sintered product are smaller than 5 μm in grain size and uniformly distributed.

Sintered ceramic bodies according to the invention are excellent in heat resistance and corrosion resistance and sufficiently high in hardness, deflective strength and fracture toughness, and it is possible to produce sintered bodies of intricate shapes. Accordingly the present invention is applicable to various machining tools, dies, machine parts, rocket components, and so on.

DESCRIPTION OF THE PREFERRED EMBODIMENTS

In the present invention the principal material is a powder of $TiB_2$, $ZrB_2$ or a mixture of these two borides, and it is desirable to use a fine powder of high purity. This invention is not concerned with the preparation of $TiB_2$ or $ZrB_2$, and it suffices to use the product of a well known method such as the direct reaction of elementary titanium or zirconium with boron or the reduction of titanium oxide or zirconium oxide. It is suitable to use a $TiB_2$ powder and/or a $ZrB_2$ powder not lower than 98% in purity and not larger than 5 μm, and preferably not larger than 2 μm, in mean particle size.

This invention employs three kinds of additives as mentioned hereinbefore. The first additive is either a vanadium compound, or elementary vanadium, or a molybdenum compound or elementary molybdenum. It is optional to use two or more kinds of vanadium compounds or molybdenum compounds, and it is also optional to use a combination of at least one vanadium compound or elementary vanadium and at least one molybdenum compound or elementary molybdenum.

Examples of useful vanadium compounds are VC, VB, $VB_2$, VO, $V_2O_5$, VN and $V_3N$, and examples of useful molybdenum compounds are $MoSi_2$, $MoSiO_2$, MoN, $MoO_2$, $MoO_3$, MoC, MoB and $MoB_2$. The use of elementary vanadium or molybdenum is almost equivalent to the use of VC or MoC because at the stage of sintering V or Mo reacts with coexisting carbon to turn into a carbide. It is preferred to use one or a selected combination of VC, VB, $VB_2$, VN, $MoSi_2$, MoN, MoC, MoB and $MoB_2$. In any case it is suitable that every component of the first additive is a powder not larger than 10 μm, and preferably not larger than 5 μm, in particle size.

To 100 parts by weight of the principal material ($TiB_2$ and/or $ZrB_2$) the amount of addition of the first additive, calculated as V and/or Mo, is from 0.5 to 99.5 parts by weight. If the amount of addition of the first additive is less than 0.5 part by weight the sintered product is insufficient in strength and toughness by reason of excessive growth of grains, and if it is more than 99.5 parts by weight the sintered product is insufficient in deflective strength due to the decreased proportion of the principal material. It is preferred to add 2 to 60 parts by weight of the first additive, calculated as V and/or Mo, to 100 parts by weight of the principal material.

The second additive is a nitride of a metal other than V and Mo. It is suitable to make a selection from TiN, ZrN, TaN, NbN, CrN, AlN and BN. If desired, two or more kinds of nitrides may be used jointly. It is suitable to use the second additive in the form of a powder not larger than 10 μm, and preferably not larger than 5 μm, in particle size.

To 100 parts by weight of the principal material, 1 to 50 parts by weight of the second additive is added. If the amount of the second additive is less than 1 part by weight the toughness of the sintered product is scarcely enhanced, and if it is more than 50 parts by weight the sintered product is relatively low in deflective strength.

The third additive is carbon or a relatively easily carbonizable material. Typical examples of carbon materials are graphite, carbon black and petroleum coke. Examples of useful carbonizable materials are thermosetting resins such as phenol resin, furan resin, polyimide resin, polyurethane resin, melamine resin and urea resin, petroleum tar and pitch. It is preferred to use a powder of graphite, carbon black, phenol resin or furan resin.

The amount of addition of the third additive, calculated as carbon, is from 0.5 to 10 parts by weight per 100 parts by weight of the principal material. If only less than 0.5 part by weight of carbon is used it is difficult to sufficiently densify the sintered composition. If more than 10 parts by weight of carbon is used it is likely that the sintered product contains free carbon and suffers from degraded physical properties by reason of unwanted growth of grains.

A sintered ceramic body according to the invention can be produced by a relatively simple sintering process.

First, powders of the principal material and the above described additives are mixed together by a suitable method. For instance, the mixing is performed in the manner of wet mixing in a ball mill using an organic liquid such as, for example, petroleum, ether, hexane, benzene, toluene, methanol, ethanol, propanol, isopropanol or carbon tetrachloride. Usually it suffices to continue the mixing operation for about 5 to 24 hr for finely dividing the agglomerated or coagulated powder particles and achieving uniform mixing. There is a possibility of intrusion of a small amount of the ball material into the mixed materials, but this phenomenon does not significantly affect the physical properties of the sintered product insofar as a suitable ceramic is used as the ball material.

After removing the organic liquid the mixed powder is compacted into a desired shape by a suitable method such as, for example, metal die molding or rubber press molding. The shaped body is sintered in vacuum or in a nonoxidizing gas atmosphere at a temperature in the range from 1600° to 2200° C. It is suitable to use an inactive gas such as argon, helium or nitrogen as the nonoxidizing gas. In this invention good sintering can be accomplished under normal pressure or reduced pressure. It is not necessary, though it is optional, to employ a gas pressure sintering method or a hot press sintering method. If the sintering temperature is below 1600° C. it is likely that the sintered body is not desirably high in relative density due to insufficient sintering. When the sintering temperature is above 2200° C. the sintered body is relatively low in deflective strength by reason of unwanted growth of grains, and such a high temperature is unfavorable for the economy of thermal energy. At 1600°-2200° C. the sintering is carried out usually for 0.5-10 hr, though an optimum duration depends on the shape and size of the shaped body.

The invention is further illustrated by the following nonlimitative examples.

EXAMPLE 1

As the principal material, a $TiB_2$ powder of 99% purity having a mean particle size of 1 μm was used. In a ball mill using zirconia balls, 100 parts by weight of the $TiB_2$ powder was mixed with VC (10 parts by weight, calculated as V), TiN (10 parts by weight) and carbon black (3 parts by weight). Each of the three kinds of additives was a powder smaller than 5 μm in particle size. The mixing was carried out for 24 hr as wet mixing using hexane.

After drying the mixed powder was packed in a metal die having a cylindrical cavity 15 mm in diameter and 10 mm in thickness and compacted by a rubber press method at a pressure of 1500 kg/cm². The disc-shaped body was placed in a graphite crucible and subjected to normal pressure sintering in argon gas at a temperature of 1850° C. for 2 hr.

The sintering resulted in slight shrinkage of the disc-shaped body, but the shrinkage was very uniform so that the sintered body had an accurate shape of disc. The sintered body had a relative density of approximately 100%. By SEM observation of arbitrary sections of the sintered body it was evident that the sintered body had a very tight crystal structure with uniform distribution of fine grains smaller than 5 μm in mean grain size. At room temperature, the hardness, deflective strength and fracture toughness of the sintered body were as shown in Table I-2.

EXAMPLES 2-21

As shown in Table I-1, Example 1 was modified in the particulars of the additives and sintering conditions. Furthermore, in Examples 17-19 a $ZrB_2$ powder of 99% purity having a mean particle size of 1 $\mu$m was used as the principal material, and in Examples 20 and 21 a mixture of 50 parts by weight of the $TiB_2$ powder and 50 parts by weight of the $ZrB_2$ powder was used. In every example each additive was a powder smaller than 5 $\mu$m in particle size. Except the items shown in Table I-1, the sintering process of Example 1 was repeated in Examples 2-21.

In every example the sintered body had a relative density of approximately 100%, and a uniform and very tight crystal structure was observed by SEM. The measurements of hardness, deflective strength and fracture toughness were as shown in Table I-2.

COMPARATIVE EXAMPLES 1-8

As shown in Table II-1, some of Examples 1-21 were modified primarily by omitting the addition of a nitride. Furthermore, in Comparative Example 6 no vanadium or molybdenum compound was added. Except the items shown in Table II-1 the sintering process of Example 1 was repeated.

In every comparative example the sintered body had a relative density of approximately 100%, and a uniform and very tight crystal structure was observed under SEM. The measurements of hardness, deflective strength and fracture toughness were as shown in Table II-2.

TABLE I-1

| | Composition | | | Sintering | |
|---|---|---|---|---|---|
| Principal Material | V and/or Mo Compound(s) (parts by wt. as V or M) | Nitride (parts by wt.) | Carbon (parts by wt.) | Temp. (°C.) | Gas |
| Ex. 1 | $TiB_2$ | VC: 10 | TiN: 10 | 3 | 1850 | Ar |
| Ex. 2 | $TiB_2$ | VC: 10 | TiN: 20 | 3 | 1900 | Ar |
| Ex. 3 | $TiB_2$ | VC: 10 | TaN: 10 | 3 | 1950 | Ar |
| Ex. 4 | $TiB_2$ | VC: 10 | TaN: 20 | 3 | 1950 | Ar |
| Ex. 5 | $TiB_2$ | $VB_2$: 20 | ZrN: 5 | 5 | 1850 | Ar |
| Ex. 6 | $TiB_2$ | VB: 50 | ZrN: 2 | 8 | 1850 | Ar |
| Ex. 7 | $TiB_2$ | VN: 20 | CrN: 40 | 4 | 1950 | $N_2$ |
| Ex. 8 | $TiB_2$ | VN: 60 | CrN: 1 | 6 | 1950 | $N_2$ |
| Ex. 9 | $TiB_2$ | $MoSi_2$: 5 | TiN: 30 | 2 | 1750 | Ar |
| Ex. 10 | $TiB_2$ | $MoSi_2$: 15 | TiN: 2 | 2 | 1750 | Ar |
| Ex. 11 | $TiB_2$ | MoC: 2 | TaN: 20 | 1 | 1950 | $N_2$ |
| Ex. 12 | $TiB_2$ | MoC: 30 | TaN: 2 | 1 | 1950 | $N_2$ |
| Ex. 13 | $TiB_2$ | MoC: 10 | BN: 3 | 7 | 1900 | $N_2$ |
| Ex. 14 | $TiB_2$ | MoB: 40 | AlN: 5 | 2 | 1750 | $N_2$ |
| Ex. 15 | $TiB_2$ | VC: 10, MoC: 10 | TiN: 20 | 3 | 1950 | Ar |
| Ex. 16 | $TiB_2$ | VC: 10, MoB: 15 | TaN: 20 | 2 | 1950 | Ar |
| Ex. 17 | $ZrB_2$ | MoC: 10 | TiN: 10 | 2 | 2130 | Ar |
| Ex. 18 | $ZrB_2$ | MoC: 10 | TiN: 20 | 2 | 2130 | Ar |
| Ex. 19 | $ZrB_2$ | MoC: 20 | TiN: 20 | 2 | 2130 | Ar |
| Ex. 20 | $TiB_2$, $ZrB_2$ | MoC: 10 | TiN: 20 | 2 | 2130 | Ar |
| Ex. 21 | $TiB_2$, $ZrB_2$ | VC: 10, MoC: 10 | TiN: 20 | 2 | 2130 | Ar |

TABLE I-2

| | Characteristics of Sintered Body | | |
|---|---|---|---|
| | Hardness $H_v$ (kg/mm$^2$) | Deflective Strength (kg/mm$^2$) | Fracture Toughness (MN/m$^{3/2}$) |
| Ex. 1 | 2310 | 93 | 5.1 |
| Ex. 2 | 2380 | 100 | 6.2 |
| Ex. 3 | 2200 | 90 | 4.9 |
| Ex. 4 | 1950 | 92 | 7.0 |
| Ex. 5 | 2280 | 100 | 4.8 |
| Ex. 6 | 2320 | 93 | 4.5 |
| Ex. 7 | 2250 | 95 | 6.9 |
| Ex. 8 | 2140 | 89 | 4.2 |
| Ex. 9 | 2180 | 97 | 7.5 |
| Ex. 10 | 2250 | 87 | 4.8 |
| Ex. 11 | 2290 | 88 | 7.1 |
| Ex. 12 | 2190 | 79 | 4.4 |
| Ex. 13 | 2120 | 87 | 4.8 |
| Ex. 14 | 2000 | 80 | 5.2 |
| Ex. 15 | 2220 | 97 | 5.9 |
| Ex. 16 | 2440 | 94 | 6.8 |
| Ex. 17 | 1720 | 65 | 6.7 |
| Ex. 18 | 1830 | 63 | 7.5 |
| Ex. 19 | 1950 | 60 | 7.9 |
| Ex. 20 | 2000 | 78 | 6.9 |
| Ex. 21 | 2010 | 76 | 6.8 |

TABLE II-1

| | Composition | | | | Sintering | |
|---|---|---|---|---|---|---|
| | Principal Material | V and/or Mo Compound(s) (parts by wt. as V or M) | Nitride | Carbon (parts by wt.) | Temp. (°C.) | Gas |
| Comp. Ex. 1 | $TiB_2$ | VC: 10 | — | 3 | 1950 | Ar |
| Comp. Ex. 2 | $TiB_2$ | VC: 1 | — | 3 | 1850 | Ar |
| Comp. Ex. 3 | $TiB_2$ | VC: 90 | — | 3 | 1950 | Ar |
| Comp. Ex. 4 | $TiB_2$ | $MoSi_2$: 15 | — | 5 | 1750 | $N_2$ |
| Comp. Ex. 5 | $TiB_2$ | VC: 10, MoC: 20 | — | 1 | 1950 | Ar |
| Comp. Ex. 6 | $ZrB_2$ | — | — | 2 | 2130 | Ar |
| Comp. Ex. 7 | $ZrB_2$ | MoC: 10 | — | 2 | 2080 | Ar |
| Comp. Ex. 8 | $ZrB_2$ | MoC: 20 | — | 3 | 2080 | Ar |

TABLE II-2

| | Characteristics of Sintered Body | | |
|---|---|---|---|
| | Hardness $H_v$ (kg/mm$^2$) | Deflective Strength (kg/mm$^2$) | Fracture Toughness (MN/m$^{3/2}$) |
| Comp. Ex. 1 | 2100 | 94 | 2.3 |
| Comp. Ex. 2 | 1800 | 72 | 2.1 |
| Comp. Ex. 3 | 2040 | 75 | 2.8 |
| Comp. Ex. 4 | 2100 | 82 | 3.2 |
| Comp. Ex. 5 | 2100 | 90 | 3.5 |
| Comp. Ex. 6 | 1010 | 48 | 4.1 |
| Comp. Ex. 7 | 1610 | 52 | 4.5 |
| Comp. Ex. 8 | 1650 | 45 | 5.0 |

From a comparison between the data of Examples 1-16 in Table I-2 and the data of Comparative Examples 1-5 in Table II-2, and also from a comparison between the data of Examples 17-19 and the data of Comparative Examples 6-8, it is apparent that the fracture toughness of either a $TiB_2$ base sintered body or a $ZrB_2$ base sintered body is remarkably enhanced by the present invention. It is seen that the deflective strength and hardness of the sintered body are also enhanced by the invention. These facts are clearly indicative that the mechanical properties of the sintered body are collectively improved by this invention.

What is claimed is:

1. A metal diboride base sintered ceramic, consisting essentially of:
    a base component which is at least one metal diboride selected from the group consisting of TiB$_2$ and ZrB$_2$;
    an auxiliary component which is at least one metal compound selected from the group consisting of VC, VN, MoSi$_2$, MoC and MoN, the amount of said auxiliary component being such that the total content of V and Mo in the sintered ceramic is 0.5–99.5 wt % of said base component;
    at least one nitride which is selected from the group consisting of TiN, ZrN, TaN, NbN, CrN, AlN and BN and amounts, in total, to 1–50 wt % of said base component; and
    carbon amounting to 0.5–10 wt % of said base component and existing as carbides.

2. A sintered ceramic body according to claim 1, wherein the amount of said auxiliary component is such that the total content of V and Mo in the sintered ceramic is 2–60 wt % of said base component.

3. A method of producing a metal diboride base sintered ceramic body, comprising the steps of:
    (a) mixing 100 parts by weight of a powdery principal material, which is at least one metal diboride selected from the group consisting of TiB$_2$ and ZrB$_2$, with 0.5 to 99.5 parts by weight of at least one metal selected from the group consisting of V and Mo, said at least one metal being in the form of a powder of at least one metal compound selected from the group consisting of VC, VN, MoSi$_2$, MoC and MoN; 1 to 50 parts by weight of a powder of at least one nitride selected from the group consisting of TiN, ZrN, TaN, NbN, CrN, AlN and BN; and 0.5 to 10 parts by weight of carbon in the form of a carbonaceous material selected from the group consisting of graphite, carbon black and carbonizable organic materials;
    (b) compacting the mixture obtained at step (a) into a shaped body; and
    (c) sintering said shaped body in vacuum or a nonoxidizing gas atmosphere at a temperature in the range from 1600° to 2200° C.

4. A method according to claim 1, wherein said organic material is selected from the group consisting of phenol resin and furan resin.

5. A method according to claim 1, wherein the total amount of said at least one metal is from 2 to 60 parts by weight.

6. A method according to claim 1, wherein the sintering at step (c) is performed under normal pressure.

* * * * *